Nov. 20, 1962 R. E. LINDEMANN 3,064,564
DUCT ROLL DRIVE
Filed March 28, 1960 3 Sheets-Sheet 1

INVENTOR.
ROBERT E. LINDEMANN
BY Hudson, Doughton,
Williams, David & Hoffmann
ATTORNEYS

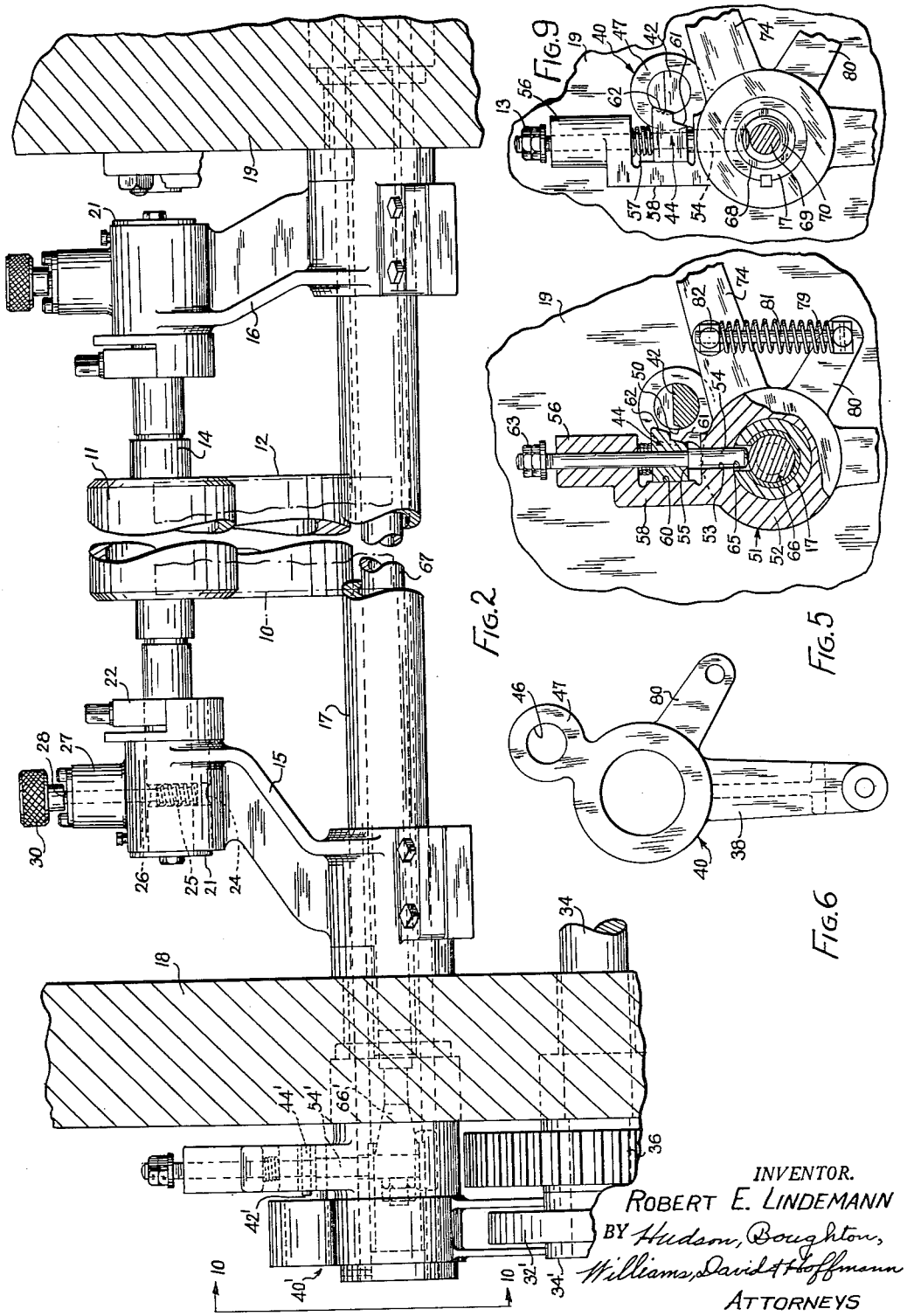

Nov. 20, 1962  R. E. LINDEMANN  3,064,564
DUCT ROLL DRIVE
Filed March 28, 1960  3 Sheets-Sheet 3
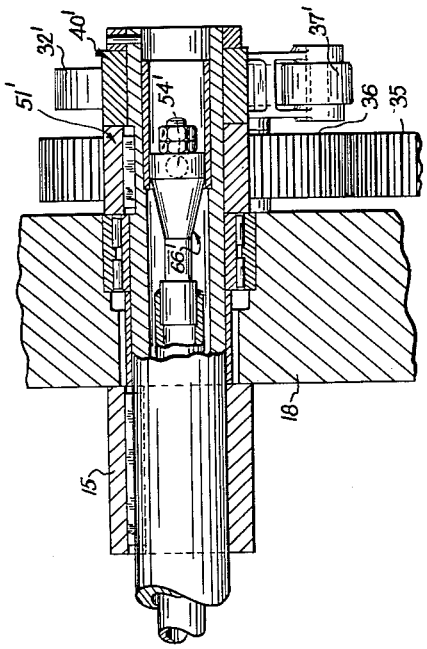
Fig. 4
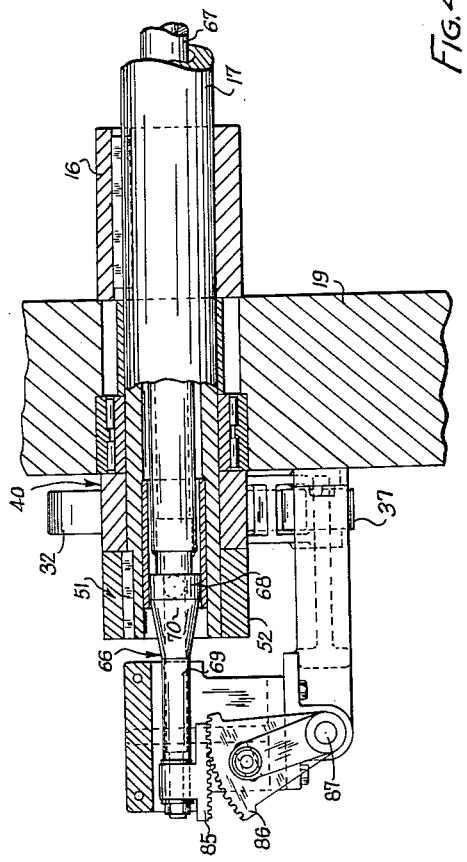
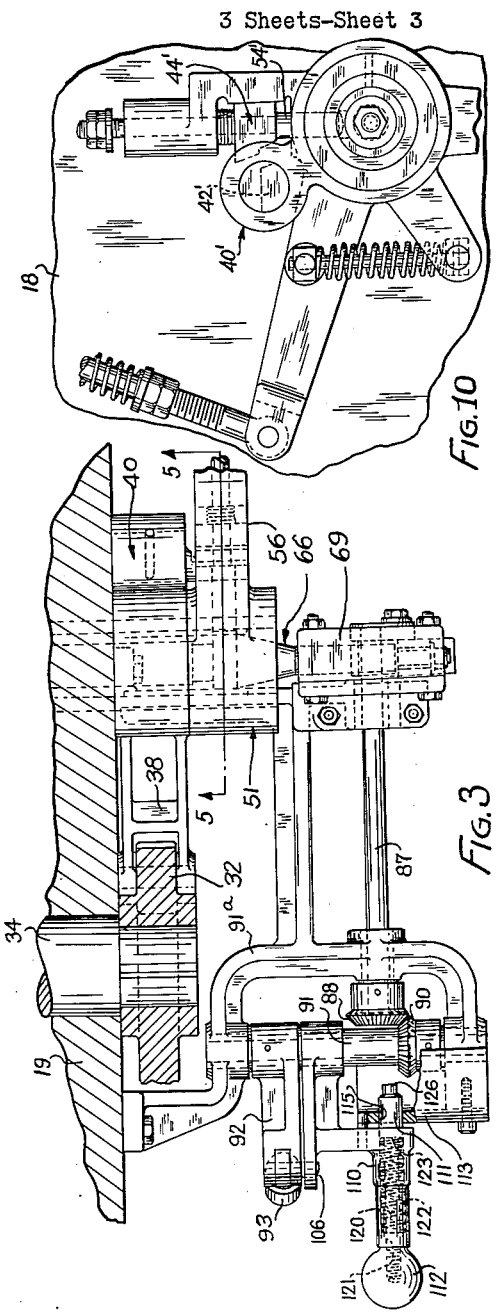
Fig. 10
Fig. 3
INVENTOR.
ROBERT E. LINDEMANN
BY Hudson, Boughton,
Williams, David & Hoffmann
ATTORNEYS

United States Patent Office 3,064,564
Patented Nov. 20, 1962

3,064,564
DUCT ROLL DRIVE
Robert E. Lindemann, Medina, Ohio, assignor to Harris-Intertype Corporation, Cleveland, Ohio, a corporation of Delaware
Filed Mar. 28, 1960, Ser. No. 17,810
12 Claims. (Cl. 101—351)

The present invention relates to a ducting mechanism for a printing press and, more particularly, to the drive for reciprocating the duct roll of the mechanism.

Ducting mechanisms are commonly embodied in printing presses as part of either the dampener or inker for respectively dampening and inking the plate. In the present application, the invention will be described primarily with reference to an inker for a printing press and it is to be understood that the description is equally applicable to a dampener or other mechanism utilizing an oscillating duct roll, unless the description specifically states otherwise.

Printing press inkers and dampeners commonly comprise a fountain roll which rotates in a reservoir of ink or dampening solution and a distributing roll which receives ink or dampening solution from the fountain roll by means of a duct roll of resilient material which oscillates or reciprocates between the fountain roll and the ink-distributing roll.

To function properly, it is important that the duct roll, upon reciprocation to effect ducting, engage both the fountain roll and the distributing roll with substantially equal pressure along the length of the duct roll. For this reason, it is desirable that both ends of the duct roll be driven to oscillate the duct roll between its positions in engagement with the fountain roll and the distributing roll, respectively. If the drive to the duct roll is only to one end of the duct roll, forces are often set up which tend to deflect or cock the roll or support therefor to cause one end of the roll to lead the other end and the duct roll may not properly engage the rolls with which it cooperates, particularly, the fountain roll, throughout the length of the duct roll. However, when a drive to each of the ends of the duct roll is provided, problems are encountered in effecting a quick and positive throwoff of the duct roll drive.

It is an important object of the present invention to provide in a printing press a new and improved drive for a duct roll, wherein the duct roll is driven adjacent both ends thereof to reciprocate the roll into engagement with the fountain roll and which is so constructed and arranged that throwoff of the drive by mechanism actuated from one side of the press is positive in its operation and quick in response to actuation of the mechanism.

Another object of the present invention is to provide in a printing press a new and improved ducting mechanism in which drive mechanism for reciprocating the duct roll is connected to drive the roll adjacent each end thereof and in which the drive connection adjacent each end of the duct roll includes a drive throwoff member for disconnecting the drive to that end of the duct roll, with the throwoff members being actuatable simultaneously from a control point at one side of the press.

Another object is to provide a new and improved mechanism as in the next preceding object which is so constructed and arranged that the actuating means for actuating the throwoff member remote from the control point is not subject to wind-up and deflection.

Another object of the present invention is to provide a new and improved ducting mechanism having a duct roll which is reciprocated between a fountain roll and a distributing roll by operating mechanism including a member which is actuatable to throw off the drive for reciprocating the duct roll and which is so constructed and arranged that the operating member can be adjusted for automatic throw-on and throwoff of the ducting mechanism when the printing cylinders of the press are thrown on or off and so that the ducting mechanism may be thrown off or on manually, and when so thrown, the mechanism for automatically throwing off the ducting mechanism is effectively disconnected.

Further objects and advantages of the present invention will be apparent from the following detailed description of the preferred embodiment made with reference to the accompanying drawings forming a part of the present specification and in which:

FIG. 2 is a fragmentary view of the inker looking approximately from the section plane of line 3—3 on FIG. 1 and in the direction of the arrows, but with the right-hand portion of the view omitted;

FIG. 3 is a view also looking from the section plane 3—3 of FIG. 1, and showing the right-hand portion omitted from FIG. 2, but on a reduced scale;

FIG. 4 is a sectional view taken approximately along line 4—4 of FIG. 1;

FIG. 5 is a sectional view taken approximately along line 5—5 of FIG. 3;

FIG. 6 is a detailed view of one of the parts of the duct-roll operating mechanism;

FIG. 9 is a side view of the mechanism shown in FIG. 8; and

FIG. 10 is a fragmentary elevational view looking from line 10—10 in FIG. 2.

Figures 1, 7, 8:
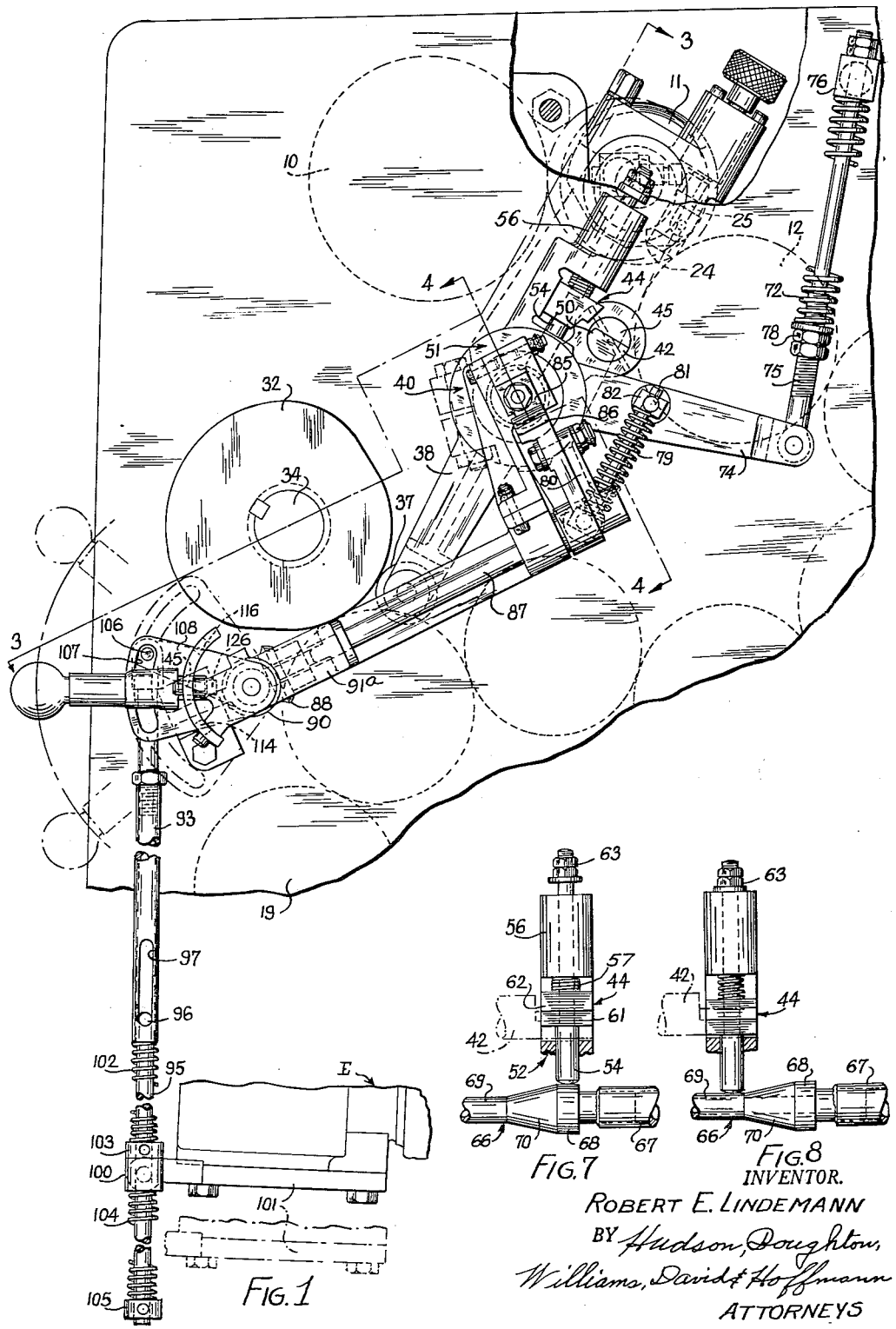
FIG. 1 is a fragmentary side elevational view of the printing press showing the inker for the press, with parts cut away.
FIGS. 7 and 8 are views, generally schematic, showing the operation of certain parts of the operating mechanism in different positions.

While the present invention may be embodied in ducting mechanisms for effecting the transfer of various materials, such as the ink or the dampening solution in a printing press, it is described herein with reference to an inker for a printing press.

The operation of a duct roll in an inker for a printing press is well understood by those skilled in the art and, therefore, the inker embodying the duct roll will not be described in detail. Suffice it to say that the inker comprises a fountain roll 10 which is rotatable in a reservoir of ink. The fountain roll 10 is indexed periodically and picks up a coating of ink and the ink on the fountain roll 10 is transferred to the first one of a plurality of ink-distributing rolls by a duct roll 11. The duct roll reciprocates between a position where it is in engagement with the fountain roll 10 and a position where it is in engagement with one of the ink-distributing rolls, which is designated by the reference numeral 12. By reciprocating the duct roll 11 between its positions, ink is transferred from the fountain roll 10 to the ink-distributing roll 12. From the ink-distributing roll 12 the ink is transferred to form rollers running in engagement with the plate cylinder of the printing press by a plurality of ink-distributing and vibrator rolls, as is well understood by those skilled in the art.

The duct roll 11 is fixed to a shaft 14 having its outer ends supported by support arms 15, 16, respectively, fixed to a quill shaft 17 extending between side frames 18, 19 of the press and supported in the side frames for oscillation relative thereto. The arms 15, 16 extend upwardly from the quill shaft 17 and the upper ends of the arms each have an eccentric 21 mounted thereon which carries a roller bearing 22 that receives the adjacent end of the shaft 14 to support the shaft 14, and in turn, the duct roll 11 for rotation relative to the arms 15, 16. The eccentric members 21 each have a worm wheel 24 formed on the periphery thereof and which meshes with a worm 25 fixed to an output shaft 26 constituting the output shaft of a bidirectional, nonreversible drive clutch 27 having an input drive shaft 28. Each of the shafts 28 has a knob 30 fixed to its outer end to provide a handgrip for rotating the shaft. The clutches 27 are of the type such that the input shaft 28 may be rotated to drive through the clutch to drive the output shaft 26 but the output shaft 26 cannot be rotated by any force applied thereto. The clutches are a conventional type, commercially available, and therefore are not described in detail. The knobs 30 may be adjusted to adjust the angularity of the eccentrics 21 and, in turn, the lateral position of the duct roll with respect to arms 15, 16.

The arms 15, 16 are secured to the quill shaft 17 adjacent the inner side of the side frames 18, 19, respectively, and the arms are reciprocated by mechanism disposed outwardly of each side frame, which mechanisms are substantially duplicates of each other. The mechanism disposed outwardly of side frame 19 will be described first. As is best shown in FIG. 4, the quill shaft 17 extends outwardly of the side frame 19. The quill shaft 17 is driven at its outer ends adjacent the side frame 19 from cam 32 disposed outwardly of the side frame 19 and fixed to a shaft 34 journalled in the side frames of the press. The shaft 34 extends across the press and outwardly of the side frames 18 and 19 and is driven in timed relation to the press drive through a gear 35. The gear 35 meshes with a gear 36 fixed to the shaft 34 adjacent the outer side of the side frame 18.

The cam 32 cooperates with a cam follower 37 which is rotatably supported by an arm 38 of a rocker member 40 journalled on the quill shaft 17 immediately adjacent the outer side of the side frame 19. Rotation of the cam 32 effects a rocking movement of the rocker member 40 about the axis of the quill shaft 17. The rocker member 40 is shown in detail in FIG. 6. The rocker member 40 carries a drive pin 42 which is engageable with a latch block 44 to move the duct roll into engagement with the fountain roll when the drive pin is reciprocated in one direction by the cam 32. The drive pin 42 has a base 43 of circular cross section which is received in an opening 46 of an extension 47 of the rocker member 40, the extension 47 being disposed on the side of the rocker member 40 remote from the arm 38. The portion of the drive pin 42 which engages the latch block 44 and which extends outwardly from the extension 47 is semicircular in cross section with a chordal flat 50 that provides the surface which is adapted to engage the latch block 44.

The latch block 44 is carried by a shaft drive member 51 keyed to the outer end of the quill shaft 17 and disposed outwardly of the rocker member 40. The shaft drive member 51 includes a cylindrical portion 52 which receives a quill shaft 17 and which has a radially extending opening 53 therein that receives a rod 54. The rod 54 extends radially outwardly of the cylindrical portion 52 and mounts the latch block 44 thereon. The outer end of the rod 54 is of reduced diameter to provide a shoulder 55 on which the latch block 44 sits. The outer end of the reduced portion of the rod 54 is received in a boss 56 connected or carried by the cylindrical portion 52 of the shaft drive member 51. A spring 57 is disposed between the boss 56 and the latch block 44 and urges the latch block 44 into engagement with the shoulder 55 which, in turn, urges the rod 54 inwardly of the cylindrical portion 52. The boss 56 is connected to the cylindrical portion 52 by a portion 58 formed integral with the boss 56 and the cylindrical portion 52 and providing a guide surface 60 on which one side of the latch block 44 rides as the rod 54 and latch block 44 are moved up and down.

The latch block 44, on the side thereof adjacent the drive pin 42, has a cutout 61 therein which is adapted to receive the drive pin 42 if the latch block is disposed in the position shown in FIG. 5 and in FIG. 1. If, however, the rod 54 and the latch block 44 are moved inwardly to the position shown in FIG. 8, the drive pin 42 will engage the latch block outwardly of the cutout at that part designated by the reference numeral 62. When the drive pin 42 is received in the cutout 61, the stroke of the drive pin 42 is such that no motion is imparted to the shaft drive member 51. If, however, the drive pin 42 engages the side of the latch block designated by the reference numeral 62, the stroke of the drive pin 42 is such that movement will be imparted to the shaft drive member 51 to rotate the quill shaft 17 and to move the duct roll 11 toward engagement with the fountain roll 10.

The drive pin 42 preferably always engages the latch block 44, when the latter is in its "on" position, at the same point in its work stroke. There is, preferably, a predetermined clearance between the latch block 44 and the drive pin 42 when the former is at its limit position corresponding to the start of the work stroke, as it is shown in FIG. 9, and this clearance may be adjusted by adjusting the eccentric members 21 with the duct roll in engagement with the distributing roll 12.

The rod 54 is reciprocated between drive-on and drive-off positions by a cam 66. The rod 54 extends through the cylindrical portion 52 of the shaft drive member 51 and through an opening 65 in the quill shaft 17 to ride on the cam member 66 which is formed on an elongated member or rod 67 extending through the quill shaft 17. The rod 67 is slidable axially relative to the quill shaft 17 to selectively shift a high cam portion 68, comprising a part of cam 66 and of relatively large diameter, and a low cam portion 69 of relatively small diameter opposite to the opening 65 in the quill shift. The portions 68, 69 are joined by a conical or inclined cam surface 70 and by shifting the rod 67, the rod 54 will move outwardly to the position of FIG. 5 when the high portion 68 is shifted into position opposite to the inner end of the rod 54, and the rod 54 will be moved inwardly to the position shown in FIG. 8, when the rod 67 is shifted to the right as viewed in FIG. 4 to position the low portion 68 opposite the inner end of rod 54. The rod 54 is urged inwardly of the quill shaft and against the cam 66 by the spring 57 and is moved outwardly against the action of the spring 57 by the conical cam surface 70 when the cam is shifted to move the cam portion 68 opposite the end of the rod 54.

The latch block 44 and, in turn, the shaft drive member 51 is urged toward the drive pin 42 to urge the duct roll 11 toward engagement with the ink-distributing roll 12 by a compression spring 72 which acts on an arm 74 of the shaft drive member 51. As pointed out hereinafter, a spring and associated structure, corresponding to the spring 72 and associated structure for biasing the duct roll, are also provided adjacent the side frame 18 so that the duct roll is urged at both ends toward the ink-distributing roll 12. The arm 74 extends outwardly from the cylindrical portion 52 and the outer end thereof is connected to a spring rod 75 slidably received in a noddle pin block 76 supported for pivotal movement by the side frame 19. The rod 75 is slidable in the block 76 and the spring 72 is disposed between the block 76 and pressure adjustment nuts 78 on the rod 75 and urges the rod 75 axially away from the block 76 to urge the shaft drive member 51 and the quill shaft 17 in a clockwise direction, as they are viewed in FIG. 5 and FIG. 1. Their movement in a clockwise direction is limited by the engagement of the duct roll 11 with the ink-distributing roll 12.

The cam follower 37 is urged into engagement with the cam 32 by a compression spring 79 connected between the arm 74 of the shaft drive member 51 and the arm 80 of the rocker member 40 which carries the cam follower 37. The spring 79 is disposed about a rod 81 slidably received in a noddle pin block 82 carried by the arm 74. The spring 79 urges the rocker member 40 in a clockwise direction about its axis, as the rocker member as viewed in FIG. 1, to urge the cam follower 37 into engagement with the cam 32. The spring 79 is lighter than the spring 72 so as not to overcome the action of the latter spring.

During operation, when the cam follower 37 is on the low point of the cam 32, the drive pin 42 is at one of its limit positions which is the limit position corresponding to the beginning of its drive stroke. In this position, the spring 72 urges the duct roll 11 into engagement with the ink-distributing roll 12 and there is normally, as previously pointed out, a spacing between the latch block 44 and the drive pin 42. As the cam 32 is rotated to move the duct roll toward engagement with the fountain roll, the drive pin 42 moves into engagement with the side 62 of the latch block 44 and effects a counterclockwise rotation of the shaft drive member 51, as the latter is viewed in FIG. 1, to move the duct roll 11 toward the fountain roll 10. The fountain roll is preferably supported for lateral adjustment so that it can be positioned such that the duct roll 11 is just riding in engagement with the fountain roll 10 when the drive pin 42 completes its drive stroke, i.e., when the cam follower 37 is riding on the high part of the cam 32. The drive from the cam 32 to the quill shaft 17 through the latch block 44 can be effectively disconnected by shifting the rod 67 axially to move the high portion 68 of the cam 66 into engagement with the inner end of the rod 54. This moves the rod 54 and the latch block 44 outwardly so that the drive pin 42 is received in the cutout 61.

The end of the quill shaft 17 extending outwardly of the side frame 18 is urged to move the duct roll toward the distributing roll 12 and is driven in a manner which is substantially the same as the manner just described with respect to the end of the quill shaft 17 adjacent frame 19. The mechanism for driving quill shaft 17 at its end adjacent side frame 18 is substantially a duplicate of that described and will not, therefore, be described in detail. Briefly be it stated that the end of the quill shaft 17 extending outwardly of the side frame 18 has a shaft drive member 51' thereon which corresponds to the shaft drive member 51 and a rocker member 40' thereon which corresponds to the rocker member 40. The rocker member 40' carries a cam follower 37' which cooperates with a cam 32' fixed to the adjacent end of the shaft 34 so that the cam 32' is rotated with the cam 32. The rocker member 40' carries a drive pin 42' which cooperates with a latch block 44' carried on a rod 54' extending radially of the shaft drive member 51' and corresponding to the rod 54. The drive pin 42', the latch block 44' and the rod 54' cooperate in the same manner as the drive pin 42, the latch block 44, and the rod 54 to drive the shaft drive member 51' to provide a drive from the cam 32' to the end of the quill shaft 17 outwardly of the side frame 18. As is apparent from FIGS. 2 and 4, the rod 67 has a cam 66' thereon which corresponds to the cam 66 and which is adapted to be reciprocated to move rod 54' between a position where the drive pin 42' will engage the latch block 44' and a position wherein the drive pin 42' will not engage the latch block 44'. Inasmuch as the latch block 44' and the drive pin 42' are substantially identical to and operate in the same manner as the latch block 44 and the drive pin 42, it is not considered necessary to repeat the description of these parts in detail. It will be noted, however, that the relative positions of the rocker member 40' and its shaft drive member 51' are interchanged when compared with the relative positions of the rocker member 40 and the shaft drive member 51. The members 40' and 51' are biased by springs corresponding to springs 72, 79, as is shown in FIG. 10.

It can be seen from the foregoing that the drive for reciprocating the duct roll 11 is effectively disconnected by shifting the rod 67 to the left, as it is viewed in FIG. 4, and effectively connected by shifting the rod to the right, as viewed in FIG. 4.

In a preferred and illustrated embodiment, the end of the rod 67 extending outwardly of the side frame 19, extends beyond the quill shaft 17 and has a rack 85 journalled to the outer end thereof. The journalling of the rod 67 to the rack will prevent the rack from being cocked if the quill shaft 17 drags the rod 67 with it as it is oscillated. The rack 85 may be guided in its reciprocating movement and held against rotary movement by a conventional guideway, not shown. The rack 85 meshes with a pinion sector 86 fixed to the end of a shaft 87 that extends parallel to the plane of the side frame 19. The shaft 87 has a bevel gear 88 fixed to its end which is opposite to the end which carries the pinion sector 86, and the bevel gear 88 meshes with a bevel gear 90 carried by a shaft 91. The shaft 91 is rotatably supported in a bracket 91a carried by the side frame 19. The shaft 91 extends crosswise of the shaft 87, as is best shown in FIG. 3. The shaft 91 has a crank arm 92 pinned thereto. A hollow rod 93 is pivotally connected at one end to the crank arm 92 to reciprocate the crank arm upon reciprocation of the rod 93. The rod 93 is hollow outwardly of its end connected to the crank arm 92 and receives a shaft 95. The shaft 95 carries a pin 96 which slides in a slot 97 in the hollow rod 93 to provide lost motion movement between the rod and the shaft. The shaft 95 extends outwardly of the hollow rod 93 through a block 100 pivotally mounted on a member 101. A spring 102 is disposed between a collar 103 pinned to the shaft 95 adjacent to the block 100 and the adjacent end of the hollow rod 93. A similar spring 104 is positioned between the block 100 and a collar 105 pinned to the outer end of the shaft 95. If the member 101 is moved upwardly, as the latter is viewed in FIG. 1, the spring 102 will act as a force transmitting connection to shift the hollow rod 93 upwardly unless the upward movement of the rod is positively prevented. In this latter case, the spring 102 will compress and the pin 96 will move along the slot 97 to allow lost motion between the member 101 and the rod 93. Similarly, the spring 104 will act as force transmitting connection if the member 101 is moved downwardly, as the latter is viewed in FIG. 1, and will compress to provide a lost motion connection if the downward movement of the rod 93 is positively prevented.

The member 101 is preferably carried by an eccentric E of a conventional eccentric throwoff type mechanism for throwing off the printing cylinders of the presses, and is preferably moved in an upward direction when the printing pressure is thrown off and in a downward direction when the printing pressure is thrown on. Movement of the hollow rod 93 is an upward direction will rotate the crank arm 92 in a clockwise direction, as viewed in FIG. 1, to cause the shaft 91 to rotate in a clockwise direction, as viewed from its right side in FIG. 3, to effect rotation of the shaft 87 in a clockwise direction, as viewed from the end of the shaft carrying the bevel gear 88. The rotation of the shaft 87 in this direction will move the pinion segment 86 outwardly to move the rack 85 outwardly of the side frame 19 to shift the rod 67 to a position where the rods 54, 54' are on the cam portions 68, 68' which effect a disconnection of the drive to the support arms 15, 16. Similarly, if the rod 93 is moved downwardly, the rack 85 will move inwardly toward side frame 19 to allow the rods 54, 54' to move inwardly as a result of their spring bias to effect the driving of the duct roll 11. It will be noted that if the member 101 is operated to throw off the duct roll drive while drive pins 42, 42' are driving the latch blocks 44, 44', the drive forces against the latch blocks will normally be sufficient to resist movement of the rod 67 by the member 101 acting through spring 102 and the spring will merely compress until the forces between the pins 42, 42' and the latch blocks 44, 44' are reduced to a point where they are overcome by the action of spring 102, and this is after the pins 42, 42' reverse their direction of movement to start their return strokes.

In a preferred and illustrated embodiment, the crank arm 92 carries a pin 106 which is received in a slot 107, in a mask member 108. The mask member has a position shown in FIG. 1 which allows the rod 93 and the crank arm 92 to be reciprocated upwardly and downwardly by the reciprocation of the member 101. When the rod 93 is so reciprocated, the pin 106 moves from one end of the slot 107 to the other end thereof. The mask member 108, however, is journalled on the shaft 91 for relative rotation and is positionable to either side of its position shown in solid lines in FIG. 1. If the mask member 108 is moved to its upper position, as shown in phantom in FIG. 1, the rod 93 will not be able to move downwardly from the throw-off position shown in FIG. 1, due to the fact that the pin 106 will be in engagement with the lower end of the slot 107. If the rod 93 has been in its lower position, or throw-on position, the movement of the mask member 108 to its upper position would force the rod 93 to the position of FIG. 1. This would be done without moving the member 101 from its phantom position shown in FIG. 1 due to the compression of the spring 104. If the mask member is moved downwardly to the lower phantom position shown in FIG. 1, the rod 93 and the crank arm 92 will be carried to the "on" position regardless of the condition of the member 101. Consequently, by shifting the mask member 108 to the position shown in phantom above the solid line position as it is viewed in FIG. 1, the ducting mechanism will be thrown off regardless of the position of member 101 and its movement. Similarly, the movement of the mask member 108 to the lower phantom position shown in FIG. 1 will effect a throwing on of the ducting mechanism regardless of the position or movement of the member 101. Therefore, it can be seen that the mask member can be positioned to render the movement of the member 101 effective to effect a throwing on and a throwing off of the ducting mechanism, or the ducting mechanism can be locked in an "on" or "off" position which is independent of the operation of the member 101. The mask member 108 has a projection 110 thereon which slidably supports a plunger 111 having a handle 112 at its lower end. The plunger 111 extends inwardly of the projection 110 toward the shaft 91 and is adapted to ride on a curved latch part 113 having three holes 114, 115, 116 therein adapted to receive the plunger 111 when the mask member 108 is in one of its three described positions.

As is shown in FIG. 3, the plunger 111 is slidably supported in a counterbore 120 in a boss-like part of projection 110 having a bore 121 through which the plunger extends to thread into the handle 112. A spring 122 is disposed within the counterbore and bears on an abutment 123 on the plunger to urge it outwardly of the counterbore into engagement with the latch part 113.

Preferably, the end of the plunger 111 received by the holes 114, 115, 116 has a terminal portion 126 of reduced diameter which just fits holes 114, 116. The center hole 115 is of a larger diameter so that the larger diameter of the plunger may be received therein. Thus, when the plunger 111 is in its center position, it will move inwardly of the latch part a greater distance than when in either of its other positions. As will be noted from FIG. 1, the handle 112 extends beyond the adjacent side edge of the side frame 19 and would extend a considerably greater distance in the center position of the plunger if it were not for the described construction. It is desirable that the handle 112 only extend sufficiently beyond the side frame to allow it to be manipulated.

While the preferred embodiment of the present invention has been described in considerable detail, it will be understood by those skilled in the art that further modifications, constructions, and arrangements can be made within the ability of those skilled in the art and it is hereby my intention to cover all such constructions, modifications and arrangements which fall within the scope and spirit of the present invention.

Having thus described my invention, what I claim is:

1. A ducting mechanism comprising a duct roll oscillatable between a fountain roll and a distributing roll, support means for said duct roll including a support at each end thereof rotatably supporting said duct roll, said supports being disposed adjacent opposite sides of said mechanism and movable in unison in first and second opposite directions to oscillate said duct to and from said distributing roll, spring means operatively connected to said support means and yieldably urging said supports in their said first direction to a position where said duct roll is in engagement with said distributing roll, drive means having a drive connection to said support means at a point adjacent each of said supports for periodically actuating said supports in their said second direction against the action of the spring means, said drive means including drive throwoff means adjacent each of said sides of the mechanism and actuatable to disconnect the drive to the said point adjacent the support on that side of the mechanism, and operating means actuatable at the will of the operator for selectively and simultaneously actuating said drive throwoff means.

2. A ducting mechanism comprising a duct roll oscillatable between a fountain roll and a distributing roll, support means for said duct roll including a support at each end thereof rotatably supporting said duct roll, said supports being disposed adjacent opposite sides of said mechanism and movable in unison in first and second opposite directions to oscillate said duct roll to and from said distributing roll, spring means operatively connected to said support means and yieldably urging said supports in their said first direction to a position where said duct roll is in engagement with said distributing roll, drive means having a drive connection to said support means at a point adjacent each of said supports for periodically actuating said supports in their said second direction, said drive means including drive throwoff means adjacent each of said sides of the mechanism and actuatable to disconnect the drive to the said point adjacent the support on that side of the mechanism, and operating means for selectively actuating said drive throwoff means, said operating means comprising a movable drive control member extending parallel to said duct roll, means outwardly of one end of said duct roll for operating said drive control member, and means responsive to the movement of said drive control member and operatively connected to each of said drive throwoff means for actuating the latter on movement of said drive control member.

3. A ducting mechanism as defined in claim 2 wherein said drive control member is an elongated member supported for axial reciprocation.

4. A ducting mechanism as defined in claim 2 and further comprising an additional member adapted to be automatically reciprocated between first and second positions when the drive to said duct roll is to be thrown off and on, a movable element connected to actuate said drive control member upon reciprocation of the element between first and second positions, and a yieldable force transmitting connection between said movable element and said additional member whereby said additional member can reciprocate with said movable element locked in either one of its said positions, and means for selectively locking said movable element in one of its said positions.

5. A ducting mechanism as defined in claim 2 wherein said drive throwoff means comprises a set of elements including a drive element and a cooperating driven element disposed at each of the sides of the mechanism to which said supports are adjacent, one of said elements of each set being supported for movement between a first position wherein a drive connection to said support means is effected and a second position wherein the drive and driven elements of the set are clear of each other and said support means is adapted to move under the influence of said spring means, a corresponding cam and cam follower for each set of said drive and driven elements, said one of said drive and driven elements of each set being operatively connected to the corresponding cam follower and said drive control member mounting said cams whereby said elements are actuated between their first and second positions by movement of said control member.

6. A ducting mechanism as defined in claim 5 wherein said drive control member extends parallel to said duct roll between said supports and is axially reciprocable to actuate said drive throwoff means.

7. A ducting mechanism as defined in claim 6 and further comprising an additional member adapted to be automatically reciprocated between first and second positions when the drive to the duct roll is to be thrown off and on, a movable element connected to reciprocate said drive control member upon reciprocation between first and second positions and a yieldable force transmitting connection between said movable element and said additional member whereby said additional member can reciprocate with said movable element locked in either one of its positions, and means for selectively locking said movable element in one of its positions.

8. A ducting mechanism comprising a duct roll, a support arm at each end of said duct roll rotatably supporting the latter, a hollow shaft extending parallel to said roll and supporting said arms for oscillation in first and second directions, spring means operatively connected to said arms and urging the latter in their said first direction, an axially slidable elongated member disposed inside said shaft, means adjacent one end of said member for axially reciprocating the latter, drive means adjacent each end of said shaft for driving said arms in opposition to said spring means and including a throw-off member supported by said shaft at each end thereof and reciprocable to effect the connection and disconnection of the adjacent drive means to drive said arms, a cam on said elongated member adjacent each throw-off member, and a cam follower corresponding to each of said throw-off members and operatively connected thereto and engageable with the adjacent cam, said cams and cooperating cam followers having cooperating surfaces such that said throw-off members are reciprocated to effect the connection and disconnection of said drive means upon the reciprocation of said elongated member.

9. A ducting mechanism comprising a duct roll, a support arm at each end of said duct roll rotatably supporting the latter, a hollow shaft extending parallel to said roll and supporting said arms, a frame rotatably supporting said shaft, means connecting said arms to said shaft for rotation therewith, spring means connected to said arms and yieldably urging said arms and shaft in one direction, an axially slidable, elongated drive control member disposed inside said shaft, means adjacent one end of said member for axially reciprocating the latter relative to said shaft, drive means adjacent each end of said shaft for rocking said shaft in opposition to said spring means and each drive means including a drive throw-off member movable transversely thereof between positions wherein said drive means is effectively connected and disconnected from said shaft, means mounting each of said drive throw-off members on said shaft and supporting said drive throw-off members for said movement transversely of said shaft, a cam follower fixed to each of said drive throw-off members and extending inwardly therefrom into said shaft toward engagement with said elongated member, a cam on said elongated member adjacent each cam follower and engaged by the latter, spring means urging each of said drive throw-off members to move the corresponding cam follower into engagement with the cam adjacent the corresponding cam follower, said cams and cooperating cam followers having cooperating surfaces such that said drive throw-off members are reciprocated to effect the connection and disconnection of said drive means upon the reciprocation of said elongated drive control member.

10. A ducting mechanism as defined in claim 9 and further comprising an additional member adapted to be automatically reciprocated between first and second positions when the drive to the duct roll is to be thrown off and on, a movable element connected to reciprocate said drive control member upon reciprocation between first and second positions and a yieldable force transmitting connection between said movable element and said additional member whereby said additional member can reciprocate with said movable element locked in either one of its positions, and means for selectively locking said movable element in one of its positions.

11. A ducting mechanism as defined in claim 9 wherein said each of said drive means further comprises a drive member adjacent said throw-off member and reciprocated continuously in work and return strokes, said throw-off member being supported for reciprocation between a position in the work stroke path of said drive member and a position clear of the work stroke path of said drive member.

12. A ducting mechanism as defined in claim 10 wherein the means for selectively locking said movable element comprises a lock member supported adjacent said movable element, a pin on said lock member adapted to reciprocate in a slot in said lock member upon reciprocation of said additional member with said lock member in a first position, and means supporting said lock member in said first position and for movement to second and third positions where the opposite ends of said slot are adjacent the respective limits of reciprocation of said pin.

References Cited in the file of this patent

UNITED STATES PATENTS

| | | |
|---|---|---|
| 971,765 | Main | Oct. 4, 1910 |
| 1,436,653 | Green | Nov. 28, 1922 |
| 1,558,686 | Lipton et al. | Oct. 27, 1925 |
| 1,585,367 | Blaine | May 18, 1926 |
| 1,683,243 | Blaine | Sept. 4, 1928 |
| 1,975,681 | Brown | Oct. 2, 1934 |
| 2,788,742 | French | Apr. 16, 1957 |